June 15, 1965    A. D. SMITH ETAL    3,189,329
COOLING TOWER AIR INLET FOR COLD CLIMATES
Filed June 6, 1962    2 Sheets-Sheet 1
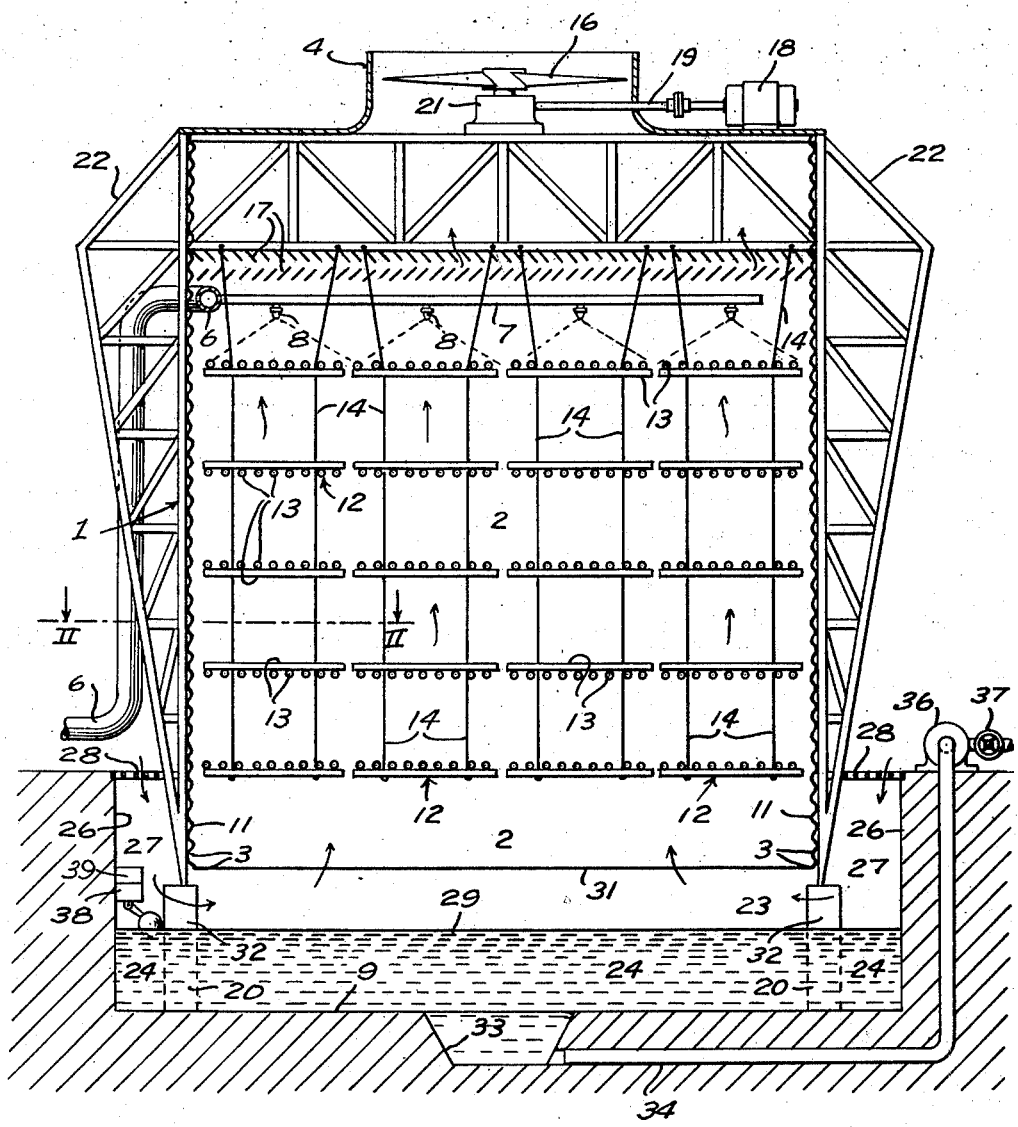
FIG. I.
INVENTORS
ARTHUR D. SMITH
ARTHUR A. BEARD
BY
ATTORNEY June 15, 1965   A. D. SMITH ETAL   3,189,329
COOLING TOWER AIR INLET FOR COLD CLIMATES
Filed June 6, 1962   2 Sheets-Sheet 2
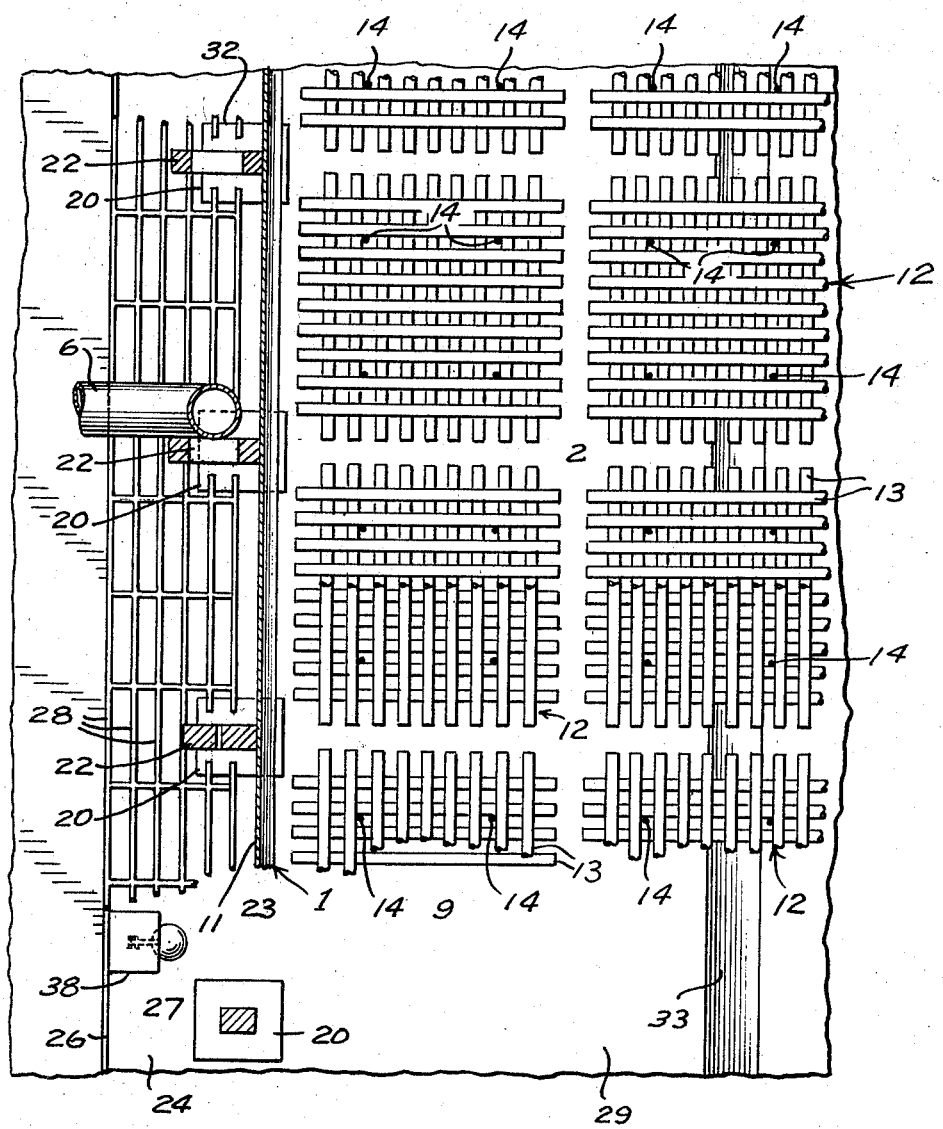
FIG. II.
INVENTORS
ARTHUR D. SMITH
ARTHUR A. BEARD
BY
ATTORNEY 3,189,329
COOLING TOWER AIR INLET FOR COLD
CLIMATES
Arthur D. Smith and Arthur A. Beard, St. Catharines, Ontario, Canada, assignors, by mesne assignments, to Fluor Products Company, Santa Rosa, Calif., a corporation of California
Filed June 6, 1962, Ser. No. 200,572
1 Claim. (Cl. 261—28)

This invention relates to cooling towers. It is an air inlet arrangement especially suited to cold climate installations.

In cooling towers air is coursed upward in direct contact with a shower of water. When the incoming air is cold, fine water drops often freeze on the air inlet structure with consequent frost clogging.

Conventional air inlet arrangements are designed to prevent splashing of water out of the casing, so these arrangements generally comprises baffles or louvers. Such devices are not only vulnerable to frosting but they also impede and complicate frost removal.

One approach to the problem has been to build more formidable air inlet structures which can withstand the rigors of frost chipping. Unfortunately, this approach has fallen prey to maintenance difficulties. Chipping frost is a relatively crude manual operation so that risk of accidental damage is high. Inspection, manual labor and supervision are generally involved. Further, with inevitable time lags from one frost chipping to the next, the quantity of air admitted to the tower at an intermediate time became anyone's guess.

Another inherent condition of such installations is that these towers usually must be capable of efficient and predictable operation the year round.

This invention solved the foregoing problems by a novel and facile air inlet arrangement. Underlying this advance is the recognition that sewer structures on city streets are invariably free of frost. It was realized that water in cooling tower basins generally has far more heat emission capability than sewer water. So applicant positioned the cooling tower air inlet to receive heat from the water in the basin.

Because it is heated by basin water, the air inlet remains frost free, just as a sewer does even with heavy snow and extremely cold temperatures. Since frost clogging is no longer an unpredictable matter in cooling tower design, arbitrary oversizing to account for this loss of air input becomes unnecessary.

Admitting air through the basin also presented an opportunity to regulate air input into the tower. Toward this objective the bottom rim of the casing was positioned in spaced relationship relative the water level in the casing to define an air opening therebetween. By controlling the water level the size of the opening is set to give the desired air input. Water level control also offers a water temperature regulating opportunity and fan power reduction.

These and other advantages will be apparent from the accompanying drawings wherein:

FIGURE I is an elevation section of a cooling tower embodying this invention.

FIGURE II is a plan section taken along line II—II of FIGURE I.

In the drawing, casing 1 is shown as a wooden structure of rigid bent design. The casing defines chamber 2, lower port 3 and upper port 4. The casing also has a generally rectangular plan section.

Water or an equivalent low volatility liquid is introduced to the chamber by water inflow means shown as line 6.

It is desirable to spread water over the entire plan area of chamber 2. Toward this objective a distribution system is shown which includes header 7 and spray nozzles 8 located in the upper portion of the chamber so that the water showers downward therethrough. Nozzles 8 have a spray pattern that insures full coverage of the plan area even with variations in water supply. After descent through chamber 2, water passes through the air receiving lower port 3 for collection in basin 9 which embraces lower portion 11 of the casing.

Decks of fill generally designated 12 retard the fall of water through the chamber. Fill breaks up water drops permitting the water to combine into other drop formations for added cooling by contact with air. The plastic hollow tube fill 13 here employed is light enough to be suspended by wires 14.

Air introduced into lower port 3 is drawn upward by fan 16 and is exhausted via upper port 4.

Drift eliminators 17 are installed to prevent water droplets entrained in the air from being carried out upper port 4.

Fan 16 is driven by motor 18 which is connected to the fan by a well known transmission 19 and speed reduction mechanism 21. This mechanical equipment is shown to be supported by rigid frames 22.

Rigid frames 22 are supported by concrete piers 20. Air is admitted to lower port 3 by way of air space 23 above water pool 24 and between concrete piers 20. Outer walls 26 are spaced from lower portion 11 of the casing to define passages 27 communicating the atmosphere with air space 23. Basin 9 is spread laterally beyond casing 1 to project under passages 27 so that passages 27 are heated by water pool 24.

A simple grating 28 is positioned over passages 27 to provide a walking surface; as well as to exclude animals, leaves, and debris from basin 9. Maintenance of such a grating presents no inordinate problems.

Water level 29 provides air load control. Bottom rim 31 is spaced from basin 9 to coact with water level 29 in defining openings 32 therebetween. Opening 32 is disposed in flow series between passages 27 and lower port 3. Basin 9 defines water outlet 33. Line 34 is connected to water outlet 33 to exhaust water pool 24 from basin 9. Pump 36 and valve 37 control the rate of exhausting water from basin 9 so that water level 29 is controlled to set the size of opening 32. Float control 38 may be arranged to control valve 37 in maintaining a desired water level 29, as by suitable control means 39.

It will be apparent to cooling tower engineers that wide changes may be made in the details of the illustrated design without departing from the scope of invention set forth in the claim.

What is claimed is:

A cooling tower construction at ground level for cold climates comprising a housing including an upright casing, the casing having side walls defining a chamber, the side walls being substantially air tight; a basin disposed below the housing having a bottom wall and upwardly extending side walls, the upper edge of the basin side walls being substantially at ground level; the casing side walls having a bottom rim which describes a lower opening communicating with the chamber; means supporting the housing whereby the bottom rim of the casing extends into the basin below ground level and spaced from the basin bottom wall to define an air passageway; the casing being dimensioned so that at least one side wall is spaced inwardly from the basin side walls to define with the basin side walls at least one peripheral air inlet substantially at ground level, the air inlet being in fluid communication with the air passageway; means for showering a relatively warm liquid downwards through the chamber, the liquid exiting through said lower opening and being collected in said basin; a fill within said chamber and comprising horizontal decks to retard the fall of liquid in the chamber; means supporting the fill whereby the lower most deck is substantially at ground level and above the level of said bottom rim; forced draft means above said fill for moving air upwards through the chamber for direct contact with the liquid showered downward therethrough, the air in said air passageway flowing downwardly and then inwardly under said bottom rim and then horizontally across the liquid collected in said basin to warm the air for maintaining the lower most fill ice free under icing conditions; the casing having an upper rim which defines an outlet opening communicating with the chamber to exhaust air therefrom, and means for sensing the level of liquid in said basin and for withdrawing liquid therefrom thereby to control the level of the liquid in the basin to in turn control the size of said air passageway, said last named means including a float within the basin, a conduit having an entrance at the basin, and a pump and valve connected in series with said conduit, the float controlling the rate of liquid flow through said valve, and control means connected to and operating with said sensing means to vary the level maintained by said sensing means.

References Cited by the Examiner

UNITED STATES PATENTS

| | | |
|---|---|---|
| 612,383 | 10/98 | Dean. |
| 621,718 | 3/99 | Seymour. |
| 821,425 | 5/06 | Meehan _____ 55—227 |
| 821,561 | 5/06 | Wheeler et al. |
| 1,027,184 | 5/12 | Coffey. |
| 1,098,002 | 5/14 | Wilson. |
| 1,287,630 | 12/18 | Burhorn _____ 261—108 X |
| 1,312,929 | 8/19 | Smallwood _____ 261—108 |
| 1,664,853 | 4/28 | Firth _____ 210—532 |
| 1,999,500 | 4/35 | Carswell et al _____ 50—54 X |
| 2,239,620 | 4/41 | Neumann _____ 55—227 |
| 2,403,545 | 7/46 | Nutting _____ 261—119 X |
| 2,540,091 | 2/51 | Brackney. |
| 2,568,891 | 9/51 | Kals _____ 261—3 X |
| 2,853,152 | 10/58 | Swift. |
| 2,898,097 | 8/59 | Goldsmith et al. |
| 2,917,292 | 12/59 | Hittrich. |

FOREIGN PATENTS

| | | |
|---|---|---|
| 414,720 | 6/10 | France. |
| 10,025 | 5/97 | Great Britain. |
| 289,118 | 4/78 | Great Britain |
| 781,160 | 8/57 | Great Britain. |

OTHER REFERENCES

"Some Types of Hangar Trusses," "Architectural Record" magazine, July 1943, page 72.

HARRY B. THORNTON, *Primary Examiner.*

HERBERT L. MARTIN, *Examiner.*